US011243693B2

(12) United States Patent
Mima et al.

(10) Patent No.: US 11,243,693 B2
(45) Date of Patent: Feb. 8, 2022

(54) PROGRAM WRITING METHOD, CONTROL METHOD OF APPARATUS, PROGRAM FOR PROGRAM WRITING, AND CONTROL PROGRAM OF APPARATUS

(71) Applicant: TOYOTA JIDOSHA KABUSHIKI KAISHA, Toyota (JP)

(72) Inventors: Kazuhiro Mima, Toyota (JP); Koji Terada, Nagakute (JP); Takahiro Nakayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 15/837,077

(22) Filed: Dec. 11, 2017

(65) Prior Publication Data
US 2018/0181312 A1 Jun. 28, 2018

(30) Foreign Application Priority Data
Dec. 22, 2016 (JP) .............................. JP2016-249379

(51) Int. Cl.
*G06F 3/06* (2006.01)
*G06F 21/57* (2013.01)
*G06F 21/10* (2013.01)

(52) U.S. Cl.
CPC ............ *G06F 3/0607* (2013.01); *G06F 3/065* (2013.01); *G06F 3/0679* (2013.01); *G06F 21/10* (2013.01); *G06F 21/57* (2013.01)

(58) Field of Classification Search
CPC ...... G06F 3/0607; G06F 3/065; G06F 3/0679; G06F 21/10; G06F 21/57
See application file for complete search history.

(56) References Cited

U.S. PATENT DOCUMENTS 9,116,713 B1 * 8/2015 Rao ..................... G06F 9/44542
2002/0042695 A1 4/2002 Kamiya et al.
(Continued)

FOREIGN PATENT DOCUMENTS

JP 11-203112 A 7/1999
JP 2000-276337 A 10/2000
(Continued)

OTHER PUBLICATIONS

Scott Chacon et al. "Pro Git" (2nd Edition), 2014 [retrieved on Nov. 19, 2020], Apress, pp. 1-426, downloaded from <url>:http://library.oapen.org/bitstream/handle/20.500.12657/28155/1001839.pdf?sequence=1. (Year: 2014).*

(Continued)

*Primary Examiner* — S. Sough
*Assistant Examiner* — Stephen D Berman
(74) *Attorney, Agent, or Firm* — Sughrue Mion, PLLC

(57) ABSTRACT

A program writing method in which a program is written into a flash ROM that a microcomputer includes therein includes: a generating step for generating a version representative value indicating a version of a source directory from predetermined types of files included in the source directory; an additionally writing step for additionally writing the version representative value into a source file included in the source directory; and a program writing step for writing a program corresponding to the source directory generated by compiling the source file into which the version representative value has been additionally written into the flash ROM.

7 Claims, 8 Drawing Sheets

(56) References Cited

U.S. PATENT DOCUMENTS

| | | | | |
|---|---|---|---|---|
| 2008/0307230 A1* | 12/2008 | Kawamae | ............... | G06F 21/64 |
| | | | | 713/176 |
| 2015/0128121 A1* | 5/2015 | Garcia | ..................... | G06F 8/65 |
| | | | | 717/170 |
| 2015/0268954 A1 | 9/2015 | Sasaki et al. | | |
| 2015/0301824 A1* | 10/2015 | Patton | ...................... | G06F 8/71 |
| | | | | 717/122 |

FOREIGN PATENT DOCUMENTS

| | | |
|---|---|---|
| JP | 2002-73346 A | 3/2002 |
| JP | 2012-88765 A | 5/2012 |
| JP | 2015-184824 A | 10/2015 |

OTHER PUBLICATIONS

Daniel German et al., "A Method for Open Source License Compliance of Java Applications," 20012 [retrieved on Jun. 4, 2021], IEEE Software, vol. 29, Issue 3, pp. 58-63, downloaded from <url>:https://ieeexplore.ieee.org. (Year: 2012).*

Sam Newan, "Building Microservices", Feb. 22, 2016. pp. 123-126 (7 pages total).

* cited by examiner

401

| VERSION REPRESENTATIVE VALUE | LICENSE INFORMATION | | TEST RESULT INFORMATION | |
|---|---|---|---|---|
| | STEREOVISION | VOICE SYNTHESIS | STEREOVISION | VOICE SYNTHESIS |
| 1fb6c1 | A1 | A2 | svtr.txt | vctr.txt |
| 17s21c | B1 | B2 | fvtr.txt | vctr.txt |
| 081ed6 | A2 | X | svtr.txt | N/A |
| ... | ... | ... | ... | ... |

A1 PERMITTED IN WORLDWIDE/COMMERCIAL USE PERMITTED
A2 PERMITTED IN WORLDWIDE/COMMERCIAL USE PROHIBITED
B1 PERMITTED ONLY IN JAPAN/COMMERCIAL USE PERMITTED
B2 PERMITTED ONLY IN JAPAN/COMMERCIAL USE PROHIBITED
X PROHIBITED

Fig. 3

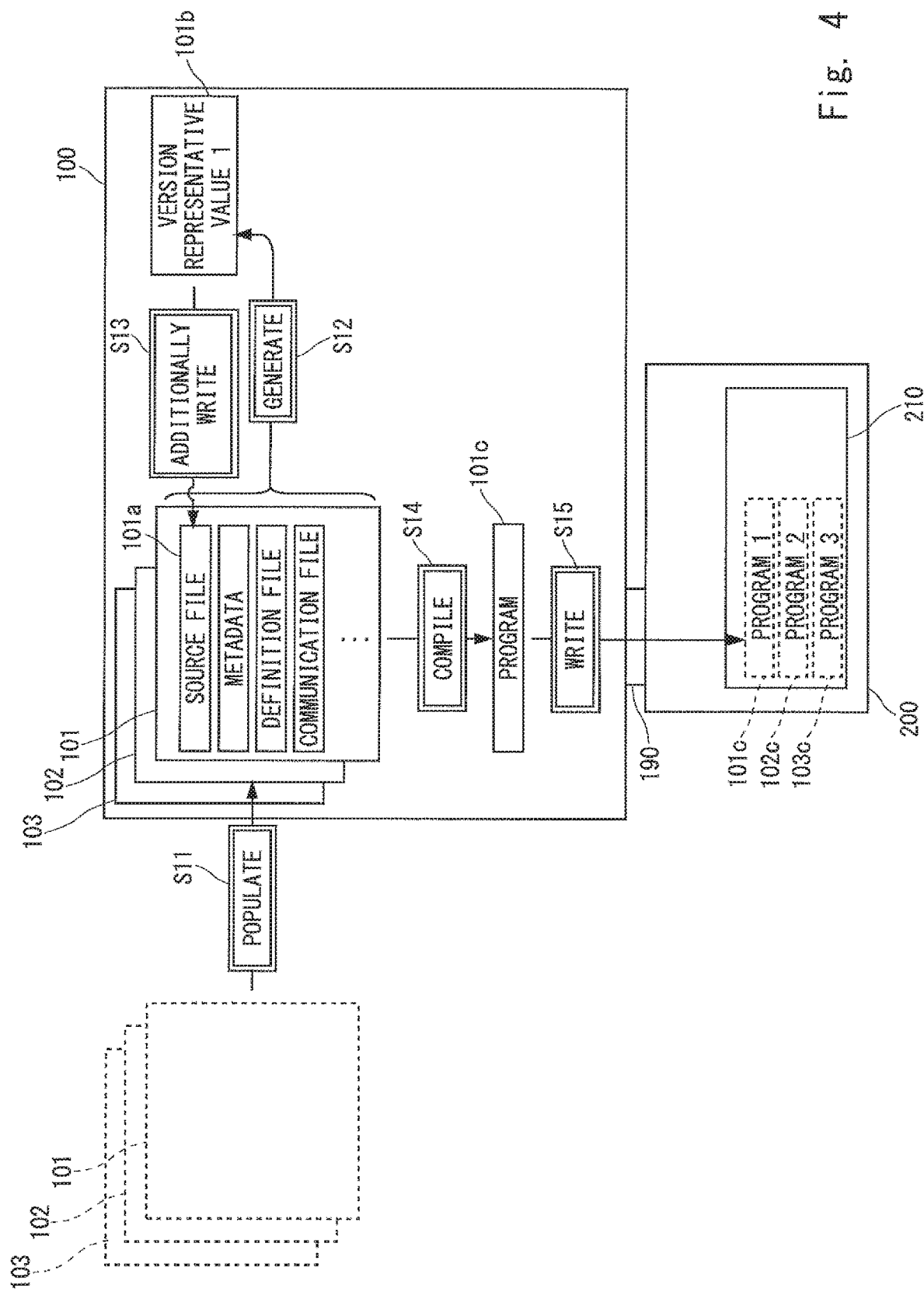

PROGRAM WRITING METHOD, CONTROL METHOD OF APPARATUS, PROGRAM FOR PROGRAM WRITING, AND CONTROL PROGRAM OF APPARATUS

CROSS REFERENCE TO RELATED APPLICATIONS

This application is based upon and claims the benefit of priority from Japanese patent application No. 2016-249379, filed on Dec. 22, 2016, the disclosure of which is incorporated herein in its entirety by reference.

BACKGROUND

The present invention relates to a program writing method, a control method of an apparatus, a program for program writing, and a control program of an apparatus.

A technique for sending back, in an apparatus on which an incorporated microcomputer including a flash ROM that stores a program and version information on the program is mounted, this version information in response to a query command from a host computer is known (see, for example, Japanese Unexamined Patent Application Publication No. 11-203112).

SUMMARY

According to the technique disclosed in the aforementioned Japanese Unexamined Patent Application Publication No. 11-203112, the version of the program stored in the microcomputer is checked by referring to a value calculated from binary data of an address in a specific range. However, in an operation of creating the program to be stored in the microcomputer, besides a source file, which is the source of the program to be written into the microcomputer, metadata, a data structure definition file, a communication data file, a document file and the like associated with the source file are also created in parallel, and these data and files are collectively managed as a source directory.

Even when there is no change in the source file, one of the files that are associated with the source file and are managed as one source directory may be changed. In particular, license information of functions that the program generated from the source file may execute (information indicating the countries in which the function can be used and whether it can be commercially used) and quality assurance information (to which extent this function is confirmed to reliably operate) may be changed regardless of whether the program itself has been changed.

When the program that has been generated is stored in the microcomputer separately from the files that are associated with this program, the apparatus into which this microcomputer is incorporated may not be able to determine which function of the program can be executed under which condition. In the development of microcomputers, a large number of source directories that are different from one another are created depending on the development stage and the differences among the apparatuses into which the microcomputers are incorporated, which leads to an increase in the number of the types of the completed microcomputers as well. In an apparatus into which the microcomputer is incorporated as well, the control program that controls the apparatus is rewritten. Therefore, it is difficult for the control program to know in advance the functions that the microcomputer that has been incorporated into the apparatus can use. That is, it is difficult for the control program of the apparatus to correctly determine whether each function of the program of the microcomputer that has been incorporated into the apparatus can be executed.

The present invention has been made in order to solve the aforementioned problem and provides a program writing method and the like capable of easily determining which kind of restrictions are imposed on the function of the program that has been written.

A program writing method according to a first aspect of the present invention is a program writing method in which a program is written into a flash ROM that a microcomputer includes therein, the method including: a generating step for generating a version representative value indicating a version of a source directory from predetermined types of files included in the source directory; an additionally writing step for additionally writing the version representative value into a source file included in the source directory; and a program writing step for writing a program generated by compiling the source file into which the version representative value has been additionally written into the flash ROM, the program corresponding to the source directory.

In this way, the version representative value corresponding to the source directory including not only the source file but also the other files associated with the source file is generated, and the format of the source file into which this version representative value is additionally written is converted into a program having a binary format and the resulting program is written into the flash ROM, whereby the incorporated apparatus can easily check from which type of source directory the microcomputer has been created.

Further, the aforementioned writing method may include an implementing step for executing the generating step, the additionally writing step, and the program writing step for each of the source directories having versions different from one another to implement the plurality of programs corresponding to the respective source directories in such a way that the programs can be used. The microcomputer created through these steps includes a flash ROM that stores a plurality of programs and is able to support a wide range of requests from the incorporated apparatus.

Further, the aforementioned writing method may include a correspondence information writing step for writing correspondence information indicating correspondence of the version representative value and a function that can be executed into the flash ROM. By causing the microcomputer to hold this correspondence information as well, the incorporated apparatus needs not acquire the correspondence information.

A control method of an apparatus according to a second aspect of the present invention is a control method of an apparatus on which the microcomputer is mounted, the program having been written into the microcomputer by the aforementioned program writing method, the method including: an acquiring step for acquiring a version representative value of a version in which execution of the function to be executed in the apparatus is permitted; a reading step for reading the version representative value that has been written into the flash ROM; and an execution processing step for executing the function when the version representative value that has been read in the reading step coincides with the version representative value acquired by the acquiring step and prohibiting the execution of the function when they do not coincide with each other.

In this way, by additionally acquiring the version representative value of the version in which execution of the function to be executed is permitted and comparing the version representative value that has been acquired with the version representative value written in the flash ROM, it is possible to correctly determine whether the control program of the apparatus can be permitted to execute the function to be executed by the program of the microcomputer. In particular, even when the condition of permission for use or the like has been changed after the microcomputer is mounted on the apparatus, it is possible to correctly make the determination.

A control method of an apparatus according to a third aspect of the present invention is a control method of an apparatus on which the microcomputer is mounted, a program having been written into the microcomputer by the aforementioned program writing method, the method including: an acquiring step for acquiring a version representative value of a version in which execution of the function to be executed in the apparatus is permitted; a reading step for reading version representative values corresponding to a plurality of respective programs written into the flash ROM; an extracting step for extracting a version representative value that coincides with the version representative value acquired by the acquiring step from among the plurality of version representative values read in the reading step; and an execution processing step for executing the function by the program corresponding to the version representative value extracted in the extracting step.

In this way, for a microcomputer including the flash ROM into which the plurality of programs have been written, the version representative value of the version in which execution of the function to be executed is permitted is additionally acquired, a version representative value that coincides with it is extracted, and the program that corresponds to the coincident version representative value is executed. It is therefore possible to support a wide range of requests from the control program of the apparatus.

A control method of an apparatus according to a fourth aspect of the present invention is a control method of an apparatus on which the microcomputer is mounted, a plurality of programs having been written into the microcomputer by the aforementioned program writing method, the method including: an extracting step for extracting a version representative value of a version in which execution of the function to be executed in the apparatus is permitted from the correspondence information; and an execution processing step for executing the function by the program corresponding to the version representative value extracted in the extracting step.

As described above, for the microcomputer including the flash ROM into which not only a plurality of programs but also correspondence information are written, the step for additionally acquiring the version representative value of the version in which execution of the function to be executed is permitted can be omitted, whereby it is possible to rapidly and accurately execute the function to be executed without causing the control program of the apparatus to communicate with the external device.

A program writing program according to a fifth aspect of the present invention causes a computer of a program writing apparatus connected to a microcomputer to execute the aforementioned program writing method. Further, a control program according to a sixth aspect of the present invention causes a host computer of an apparatus to execute the aforementioned control method of the apparatus.

According to the present invention, it is possible to provide a program writing method and the like capable of easily determining which kind of restrictions are imposed on the function of the program that has been written.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 3 is an example of a version representative value list;

FIG. 4 is a diagram showing an apparatus configuration and a process procedure for describing a program writing method according to a second example in this embodiment;

DESCRIPTION OF EMBODIMENTS

Hereinafter, the present invention will be explained with reference to an embodiment of the present invention. However, the invention set forth in claims is not limited to the following embodiment. Further, not all the components described in the embodiment may be necessary as the means for solving the problems.

Figure 1:
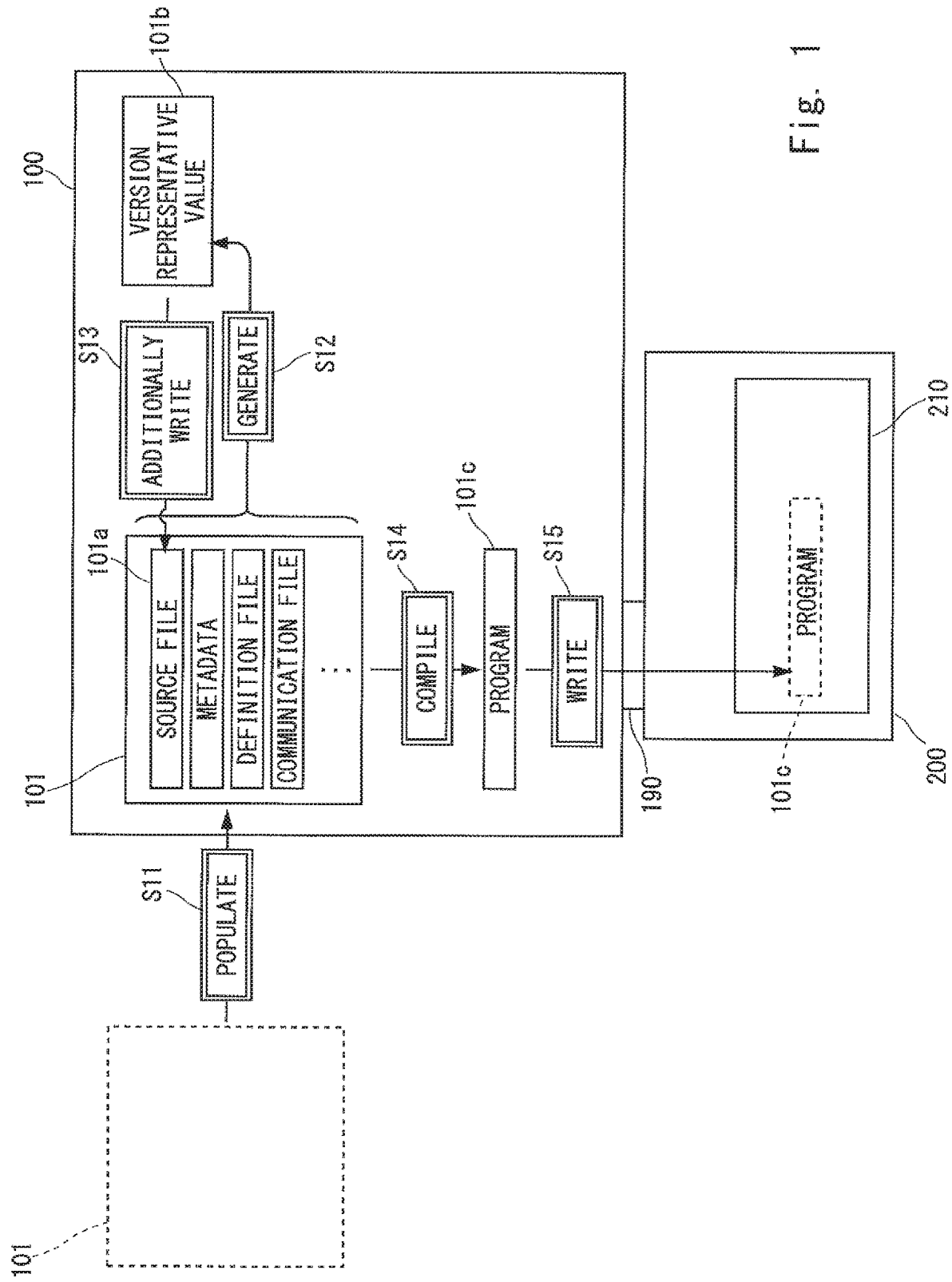
FIG. 1 is a diagram showing an apparatus configuration and a process procedure for describing a program writing method according to a first example in an embodiment.

FIG. 1 is a diagram showing an apparatus configuration and a process procedure for describing a program writing method according to a first example in this embodiment. The program writing method according to this embodiment is a writing method for writing a program into a flash ROM 210 included in a microcomputer 200. This method is achieved by executing, by a computer of a microcomputer creating PC 100 which serves as a program writing apparatus connected to the microcomputer 200, a writing program.

The microcomputer creating PC 100 is able to rewrite the content stored in the flash ROM 210 of the microcomputer 200 connected via a connection IF 190, which is a communication interface. The microcomputer 200 is a microprocessor configured to execute the program written into the flash ROM 210 on a function requested by a host computer, to thereby output the result of the operation. One program 101c is written in the flash ROM 210 created by this example. The process until the time when the program 101c is written into the flash ROM 210 will now be explained.

The computer of the microcomputer creating PC 100 populates a source directory 101 created by an external development apparatus (Step S11). The source directory 101 includes, besides a source file 101a to be converted into a program having a binary format as a result of compilation, a metadata file, a data structure definition file, a communication data file, a document file and the like associated with the source file 101a.

The computer of the microcomputer creating PC 100 generates a version representative value 101b indicating the version corresponding to the source directory 101 from predetermined kinds of files among the files included in the source directory 101 (Step S12). The predetermined kinds of files that are selected include, for example, besides the source file 101a, the metadata file and the data structure definition file. Since the version representative value corresponding to the source directory varies due to the presence of the file that has been changed, the types of the predetermined files are preferably selected in such a way that they include files that are expected to be gradually changed at the time of development of microcomputers.

The computer of the microcomputer creating PC 100 uses, for example, Git as a version management system in Step S12 and generates Commit_ID as the version representative value 101b. Commit_ID is expressed by a commit hash value and is generated in accordance with the grammar form of the source file 101a expressed by, for example, C language.

The computer of the microcomputer creating PC 100 additionally writes the version representative value 101b thus generated in a predetermined location of the source file 101a. Then the source file 101a in which the version representative value 101b has been additionally written is compiled to generate the program 101c having a binary format (Step S14).

The computer of the microcomputer creating PC 100 writes this program 101c into the flash ROM 210 via the connection IF 190 (Step S15). As a result of these processes, the microcomputer 200 to be incorporated into a target apparatus is completed. The completed microcomputer 200 includes the program 101c written into the flash ROM 210 embedded with the information on the version representative value 101b corresponding to the source directory 101 in which the source file 101a has been included. The host computer of the apparatus into which the microcomputer 200 has been incorporated and the computer of the microcomputer creating PC 100 are able to extract and reproduce the version representative value 101b from the binary code of the program 101c by the reading program.

Since the version representative value 101b is generated also based on files other than the source file 101a, even when the source file 101a has not been changed at a development stage, if any one of the files that are associated with this source file has been changed, the version representative value 101b becomes different from the previous value. Accordingly, even when the function that can be executed by the written program is the same, if the version representative values read out by the reading program are different from each other, it turns out that the source directories in which the original source files are included are different from each other. In other words, by checking the version representative value, the source directory in which the original source file has been included can be specified. That the source directory can be specified is advantageous also for the developer who develops microcomputers in terms of efficiency of the following operations such as change and correction.

Figure 2:
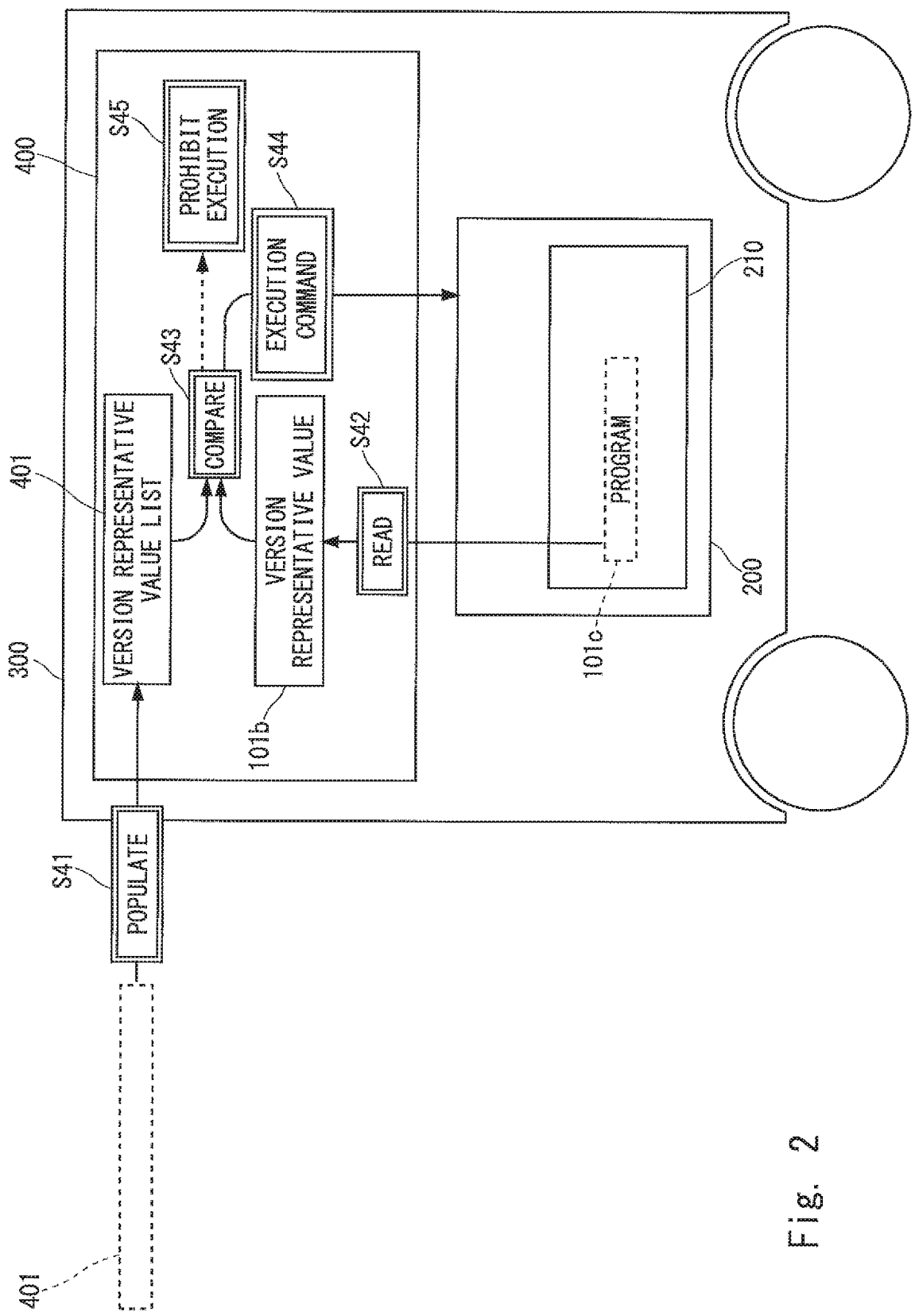
FIG. 2 is a diagram showing an apparatus configuration and a process procedure for describing a control method of a robot into which a created microcomputer is incorporated.

Next, a control method of an apparatus on which the microcomputer 200 thus created is mounted will be explained. In this example, an autonomous moving robot is described as one example of the apparatus. FIG. 2 is a diagram showing an apparatus configuration and a process procedure for describing a control method of a robot 300 including a control substrate into which the created microcomputer 200 is incorporated. The robot 300 includes a host computer 400. The host computer 400 executes a control program for performing the whole control of the robot 300 by causing a plurality of function programs to be selectively executed.

The host computer 400 selects, when a specific process needs to be executed during the control of the robot 300, the function program having the function that achieves this process and executes the selected function program. The program 101c written into the flash ROM 210 of the microcomputer 200 is one of these function programs. Accordingly, the host computer 400 accesses the microcomputer 200 when it desires to execute the function that the program 101c has.

The host computer 400 first populates a version representative value list 401 from an external device, a removable memory or the like when it executes the function that the program 101c has (Step S41). This populating operation may be executed at the same time that the power supply of the robot 300 is turned on or may be executed in advance upon receiving an input instruction by an operator or the like.

The version representative value list 401 will now be explained. FIG. 3 is an example of the version representative value list 401. The version representative value list 401 is a list in which each of the version representative values that have already been generated is associated with license information and test result information for each function that the corresponding program may execute. In this example, stereovision, in which the surrounding environment is recognized in a three dimensional way using two image-capturing units, and voice synthesis, in which a voice emitted to a nearby person is generated, are shown as examples of the functions that the program may execute.

The license information can be categorized by the region in which the function is executed. The license information can be categorized, for example, depending on whether it is permitted worldwide, it is permitted only in Japan, or it is not permitted in any country. Further, the license information can be categorized by the usage form in which the function is used. The license information can be categorized, for example, depending on whether it is permitted to be commercially used, whether it is permitted to be used for tests but not for commercial use, or whether it is not permitted to be used for any purpose. As shown in FIG. 3, the symbol A2 indicates, for example, that the function can be executed worldwide and can be used for tests, but not for commercial use. If the robot 300 is commercially used when the host computer 400 tries to execute the function of the voice synthesis, the program of the version representative value 101b with the symbol A2 cannot be executed.

The test result information indicates, as quality assurance information indicating the reliability when the function is executed, link information for a file in which the test results have been described. The linked file describes, for example, to which extent this function is confirmed to reliably operate or under which condition it can normally operate. For example, svtr.txt, which is shown in the column of stereovision, describes, for example, that the recognition rate of an object of 1 square cm at a distance of 1 m is 60%. If the control program requires that the recognition rate needs to be 90% or larger when the host computer 400 tries to execute the function of stereovision, the execution of the program of the version representative value 101b having the link information for svtr.txt is prohibited. In FIG. 3, N/A indicates that there is no corresponding file.

Referring back to FIG. 2, Step S41 and the following steps will now be explained. When the version representative value list 401 is populated in Step S41, the host computer 400 accesses the flash ROM 210 of the microcomputer 200 and reads the version representative value 101b that has been written as a part of the program 101c (Step S42). Then it is determined whether the version representative value 101b read from the program 101c is included in the version representative values in the version representative value list 401 in which execution of the function is permitted by comparing these values (Step S43).

Assume a case, as an example, in which the robot 300 is commercially operated in Japan and the host computer 400 tries to cause the program 101c to execute the function of stereovision. In this case, referring to the version representative value list 401 in FIG. 4, it is determined that the execution of the function of stereovision is permitted when the version representative value 101b read from the program 101c coincides with one of "1fb6c1" and "17s21c". A symbol A1 (permitted in worldwide/commercial use permitted) is given to the version representative value "1fb6c1" as the license information and a symbol B1 (permitted only in Japan/commercial use permitted) is given to the version representative value "17s21c" as the license information.

In this example, the execution condition for the quality assurance has not been configured in the control program. However, when the condition for the quality assurance is configured in the control program, the host computer 400 checks the test result information on the version representative value list 401 as well. That is, the host computer 400 searches for the version representative value that satisfies both the condition of the license information and that of the test result information, and determines whether the version representative value coincides with the version representative value 101b read from the program 101c by comparing these values.

The place (country) where and the way (commercial/tests) the robot 300 will be used may be input by an operator in advance or may be automatically set using sensor information. For example, the host computer 400 is able to automatically set the above place and way by acquiring GPS information and recognizing that the robot 300 is located in a commercial space such as a shopping mall.

Further, in the aforementioned example, the host computer 400 populates the whole version representative value list 401 and extracts and specifies the version representative value in which execution of the function to be executed is permitted from the populated list. Instead of populating the whole version representative value list 401, only the version representative value in which execution of the function to be executed is permitted may be populated. That is, the operation of extracting the version representative value that satisfies the condition from the version representative value list 401 may be executed by the host computer 400 or by an external computer. In any case, the host computer 400 acquires the version representative value extracted from the version representative value list 401 and determines whether the version representative value that has been acquired coincides with the version representative value 101b read from the program 101c by comparing these values.

When it is determined as a result of the comparison in Step S43 that the two version representative values coincide with each other, the host computer 400 executes this function (Step S44). When it is determined that the two version representative values do not coincide with each other, the host computer 400 prohibits the execution of this function (Step S45). In Step S44, the host computer 400 sends an instruction for executing this function to the microcomputer 200. Then the microcomputer 200 executes the program 101c upon receiving this instruction.

By processing the execution or the prohibition of the function by the aforementioned procedure, even when the control program is updated after the microcomputer 200 is mounted on the robot 300, the program of the microcomputer 200 can be used in accordance with the instruction for operating the latest control program. Further, even when the license information or the test result information is updated after the microcomputer 200 is mounted on the robot 300, it is possible to use the program of the microcomputer 200 in accordance with the latest situation.

Next, a second example according to this embodiment will be explained. FIG. 4 is a diagram showing an apparatus configuration and a process procedure for describing a program writing method according to the second example. Unless otherwise mentioned, the apparatus configuration and the process procedure similar to those shown in FIG. 1 are denoted by the same reference symbols and descriptions thereof will be omitted.

In the program writing method according to the first example, only one program is written into the flash ROM 210 of the microcomputer 200. In the program writing method according to the second example, a plurality of programs are written into the flash ROM 210. To be more specific, Steps S11 to S15 are repeatedly executed for source directories 101, 102, 103 . . . having versions different from one another and programs 101c, 102c, 103c . . . corresponding to the source directories 101, 102, 103 . . . , respectively, are implemented in the flash ROM 210 in such a way that they can be used.

The programs 101c, 102c, and 103c written into the flash ROM 210 are embedded with information on version representative values that are different from one another. Since the microcomputer 200 that has been created through these steps includes a plurality of programs in the flash ROM 210, it is possible to obtain not only the advantages of the microcomputer 200 according to the first example but also the advantage that it is possible to support a wide range of requests from the incorporated apparatus.

Figure 5:
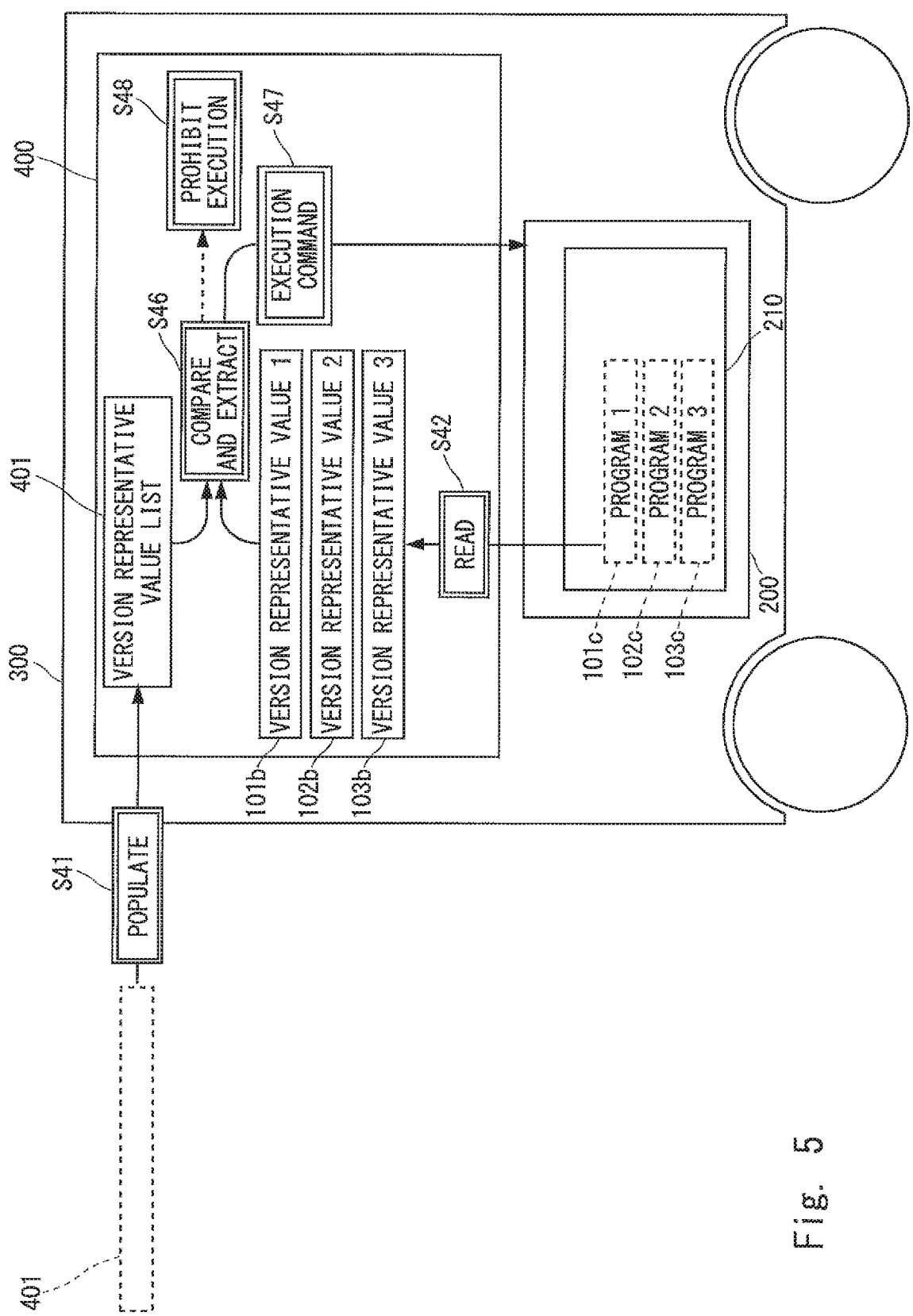
FIG. 5 is a diagram showing an apparatus configuration and a process procedure for describing a control method of a robot into which the created microcomputer is incorporated.

Next, a control method of an apparatus on which the microcomputer 200 thus created is mounted will be explained. In this example, similar to the first example, the autonomous moving robot is described as one example of the apparatus. FIG. 5 is a diagram showing an apparatus configuration and a process procedure for describing a control method of the robot 300 including a control substrate into which the created microcomputer 200 is incorporated. Unless otherwise mentioned, the apparatus configuration and the process procedure similar to those shown in FIG. 2 are denoted by the same reference symbols and descriptions thereof will be omitted. While the number of programs written into the flash ROM 210 is not limited as long as it is plural in this example, it is assumed here that three programs 101c, 102c, and 103c are written.

When the version representative value list 401 is populated in Step S41, the host computer 400 accesses the flash ROM 210 of the microcomputer 200 in Step S42 to read the version representative value 101b written as a part of the program 101c, the version representative value 102b written as a part of the program 102c, and the version representative value 103b written as a part of the program 103c. Then it is determined whether at least one of the version representative values 101b, 102b, and 103b that have been read is included in the version representative values in the version representative value list 401 in which execution of the function is permitted by comparing these values and the version representative value 101b, 102b, or 103b that coincides with the version representative values in the version representative value list 401 is extracted (Step S46).

The host computer 400 specifies the program corresponding to the version representative value extracted in Step S46 and sends an instruction for executing this function to the microcomputer 200 (Step S47). Upon receiving the instruction, the microcomputer 200 executes the program that has been specified. If none of the version representative values coincides with the version representative value in the version representative value list 401 in Step S46, the execution of the function is prohibited (Step S48). If there are a plurality of version representative values that coincide with the version representative values in the version representative value list 401 in Step S46, the host computer 400 selects one of them as the target to be executed. For example, the version representative value which exhibits an excellent test result or the version representative value that has been generated more recently may be selected.

By processing the execution or the prohibition of the function by the aforementioned procedure, it is possible to obtain not only the advantages of the processing in the first example but also the advantage that there is a high possibility that the function can be executed in response to the request for the control program of the apparatus into which the microcomputer 200 is incorporated.

Figure 6:
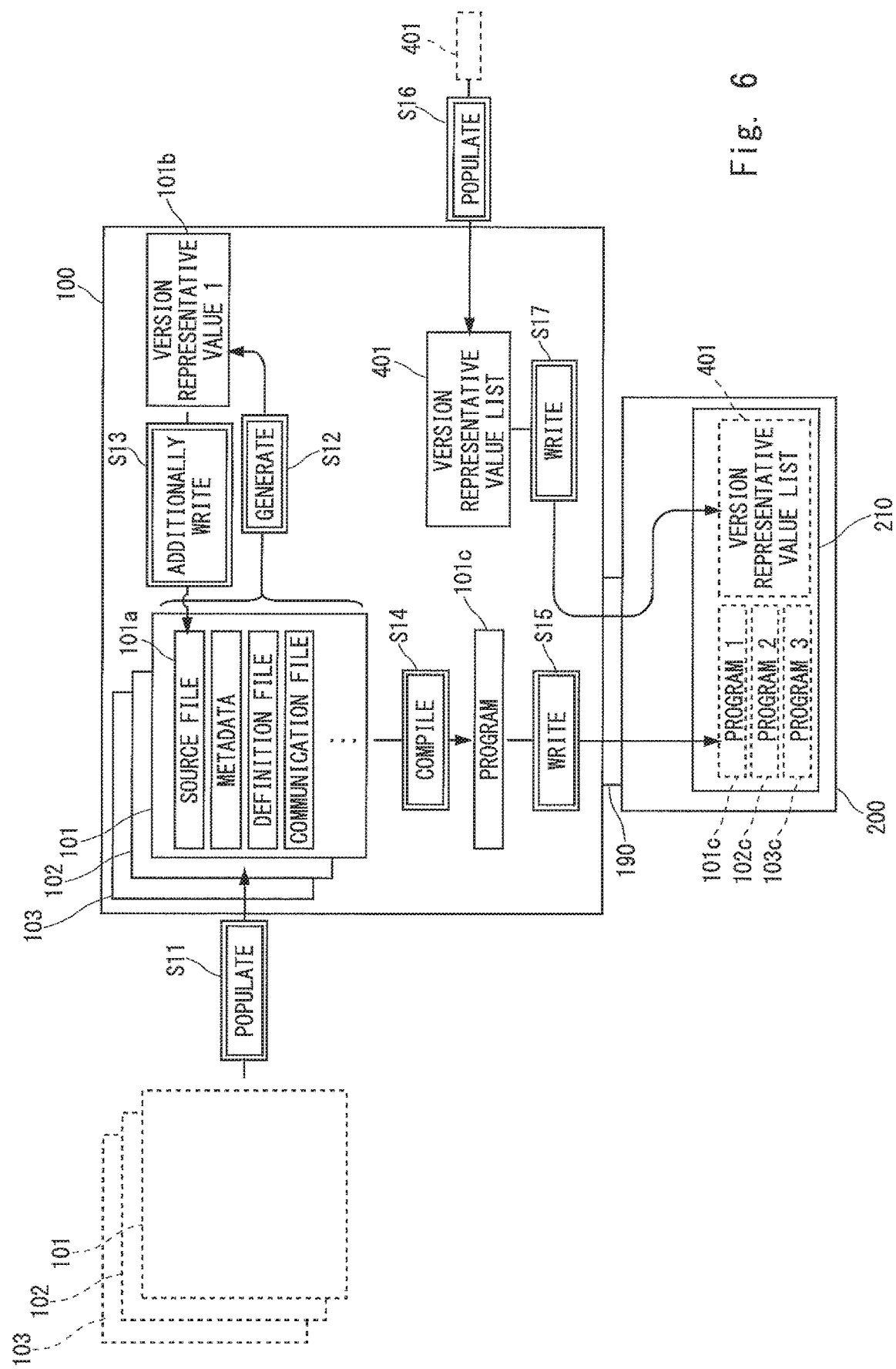
FIG. 6 is a diagram showing an apparatus configuration and a process procedure for describing a program writing method according to a third example in this embodiment.

Next, a third example according to this embodiment will be explained. FIG. 6 is a diagram showing an apparatus configuration and a process procedure for describing the program writing method according to the third example. Unless otherwise mentioned, the apparatus configuration and the process procedure similar to those shown in FIGS. 1 and 4 are denoted by the same reference symbols and descriptions thereof will be omitted.

In the program writing method according to the second example, only the program is written into the flash ROM 210 of the microcomputer 200. In the third example, a plurality of programs are written into the flash ROM 210 and the version representative value list 401 is also written into the flash ROM 210. To be more specific, when the iteration of up to Step S15 is completed, the computer of the microcomputer creating PC 100 populates the version representative value list 401 from, for example, an external device or an internal memory of the microcomputer creating PC 100 (Step S16). Then the populated version representative value list 401 is written into the flash ROM 210 (Step S17). The microcomputer 200 that has been created through these steps holds the version representative value list as the correspondence information in the flash ROM 210, whereby it is possible to obtain not only the advantages of the microcomputer 200 according to the second example but also the advantage that the incorporated apparatus need not acquire the version representative value list.

In Step S17, the computer of the microcomputer creating PC 100 may not directly write the version representative value list 401 populated in Step S16 and may instead write a reconfigured version representative value list. For example, the version representative values permitted for the function that each program written in Step S15 may execute may be extracted, and the version representative value list composed of only the version representative values that have been extracted may be created and written into the flash ROM 210.

Figure 7:
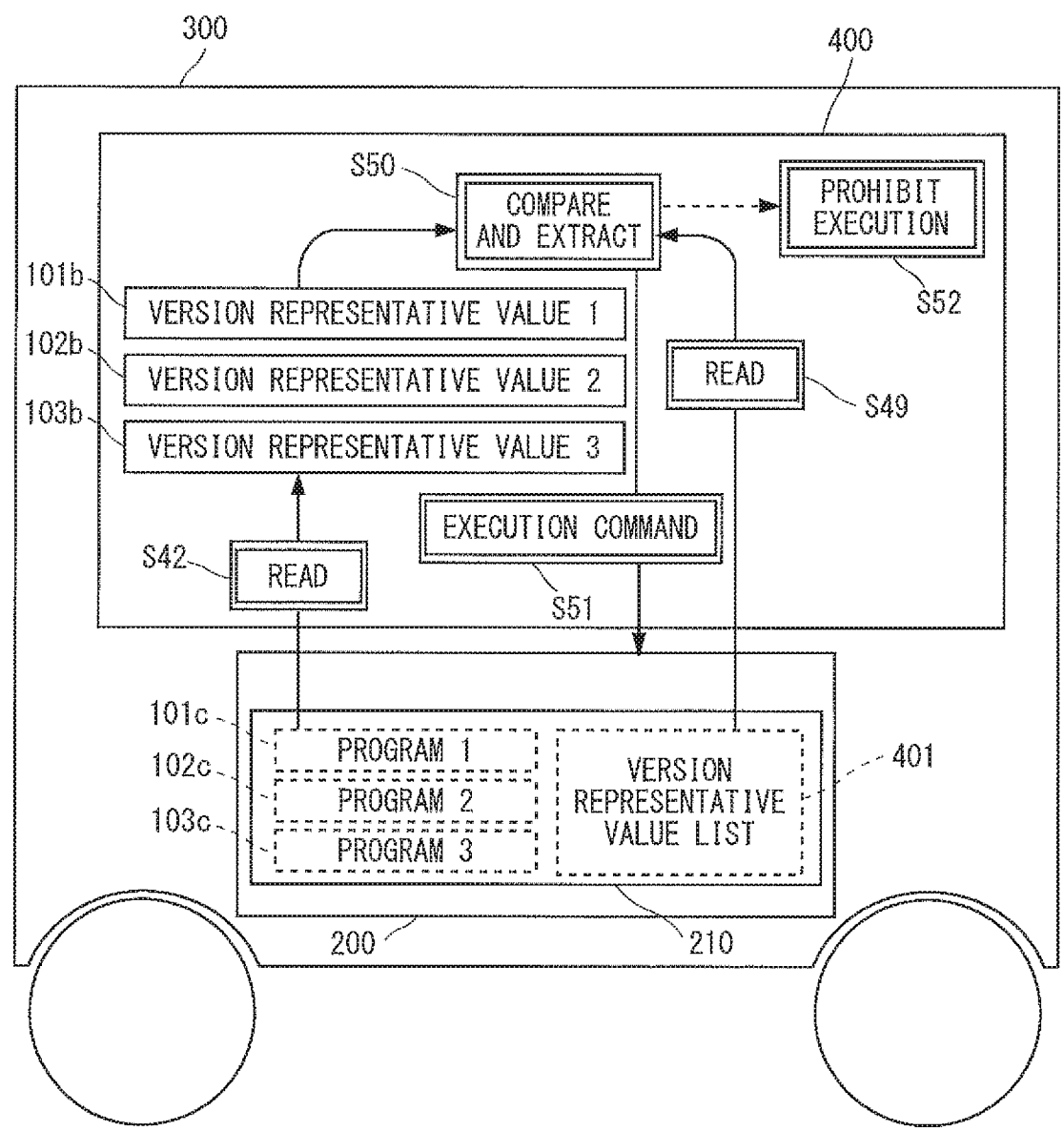
FIG. 7 is a diagram showing an apparatus configuration and a process procedure for describing a control method of a robot into which the created microcomputer is incorporated.

Next, a control method of an apparatus on which the microcomputer 200 thus created is mounted will be explained. In this case, similar to the first and second examples, the autonomous moving robot will be described as one example of the apparatus. FIG. 7 is a diagram showing an apparatus configuration and a process procedure for describing a control method of the robot 300 including a control substrate into which the created microcomputer 200 is incorporated. Unless otherwise mentioned, the apparatus configuration and the process procedure similar to those shown in FIGS. 2 and 5 are denoted by the same reference symbols and descriptions thereof will be omitted.

In this example, the host computer 400 executes Step S42 without populating the version representative value list 401 and reads the version representative values 101b, 102b, and 103b from the flash ROM 210. Next, the host computer 400 reads the version representative value list 401 from the flash ROM 210 (Step S49). Steps S42 and S43 may be reversed.

The host computer 400 determines whether at least one of the version representative values 101b, 102b, and 103b that have been read is included in the version representative values in the version representative value list 401 in which execution of the function is permitted by comparing these values and extracts the version representative value 101b, 102b, or 103b that coincides with the version representative value in the version representative value list 401 (Step S50). The host computer 400 specifies the program corresponding to the version representative value extracted in Step S50 and sends an instruction for executing this function to the microcomputer 200 (Step S51). Upon receiving the instruction, the microcomputer 200 executes the program that has been specified.

If none of the version representative values has coincided with the version representative value in the version representative value list 401 in Step S50, the execution of this function is prohibited (Step S52). If there are a plurality of version representative values that coincide with the version representative value in the version representative value list 401 in Step S50, the host computer 400 selects one of them as the target to be executed. For example, the version representative value which exhibits an excellent test result or the version representative value that has been generated more recently may be selected.

By processing the execution or the prohibition of the function by the aforementioned procedure, it is possible to obtain not only the advantages of the processing in the first and second examples but also the advantage that it is possible to promptly and accurately execute the function that is desired to be executed without causing the host computer 400 to communicate with the external device.

Figure 8:
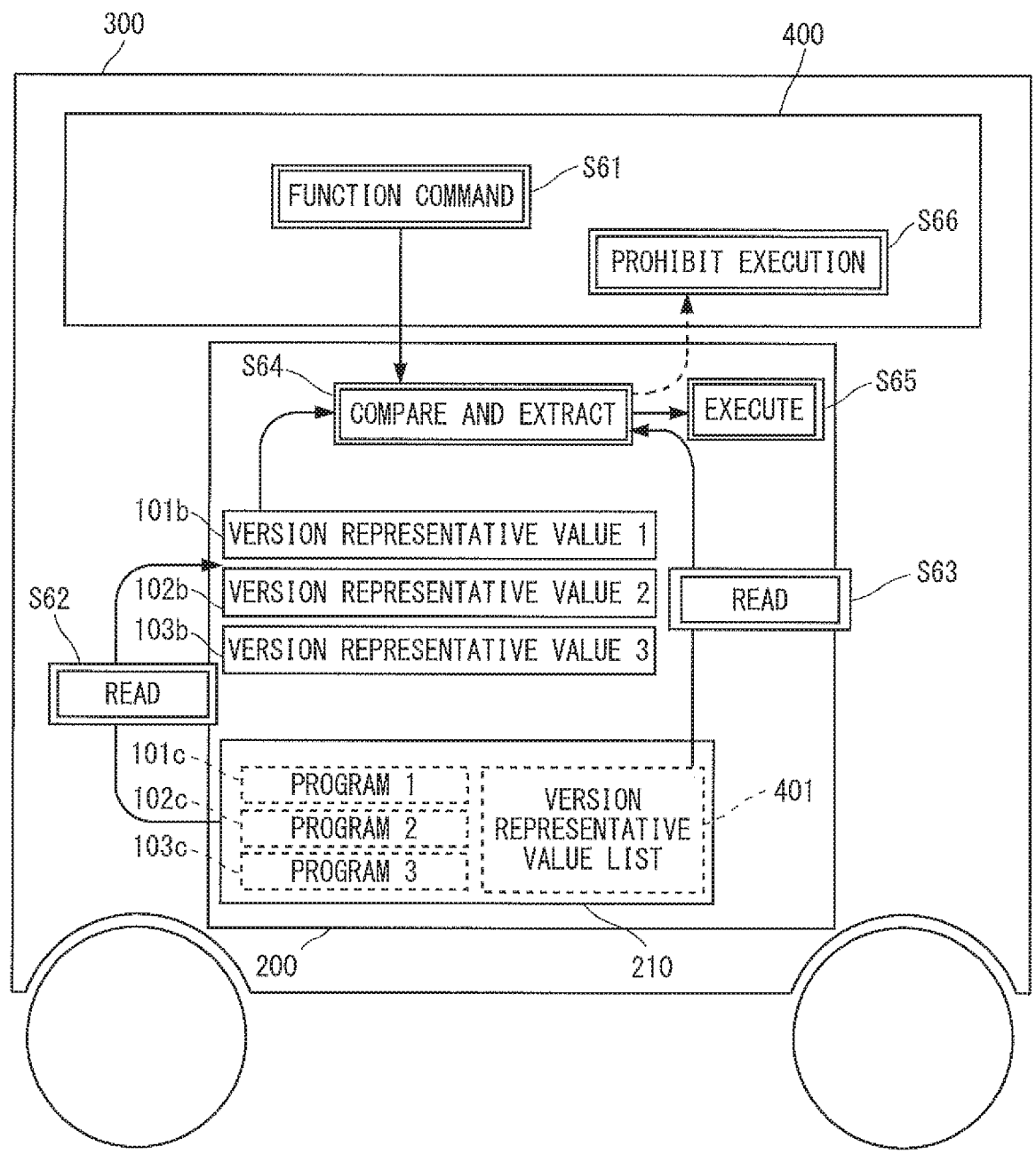
FIG. 8 is a diagram showing an apparatus configuration and a process procedure for describing the control method of the robot into which the created microcomputer is incorporated.

Further, a modified example of the third example will be explained. FIG. 8 is a diagram showing an apparatus configuration and a process procedure for describing a control method of the robot 300 in which the microcomputer 200 that has been created through the process procedure described in FIG. 6 is incorporated.

In the example described with reference to FIG. 7, the host computer 400 executes the processing of reading the version representative values 101b, 102b, and 103b from the flash ROM 210 and the processing of reading the version representative value list 401 from the flash ROM 210. On the other hand, in this modified example, the microcomputer 200 performs these processing.

The host computer 400 sends a function command for executing the function which is desired to be executed to the microcomputer 200 (Step S61). Upon receiving the function command, the microcomputer 200 reads the version representative values 101b, 102b, and 103b from the flash ROM 210 (Step S62). Next, the microcomputer 200 reads the version representative value list 401 from the flash ROM 210 (Step S63). Steps S62 and S63 may be reversed.

The microcomputer 200 determines whether at least one of the version representative values 101b, 102b, and 103b that have been read is included in the version representative values in the version representative value list 401 in which execution of the function is permitted by comparing these values and extracts the version representative value 101b, 102b, or 103b that coincides with the version representative value in the version representative value list 401 (Step S64). The microcomputer 200 deploys the program corresponding to the version representative value extracted in Step S64 to execute the deployed program (Step S65). However, if none of the version representative values has coincided with the version representative value in Step S64, the microcomputer 200 sends back an unexecutable flag indicating that this function could not be executed to the host computer 400 (Step S66).

By processing the execution or the prohibition of the function by the aforementioned procedure, it is possible to reduce the processing load of the host computer 400.

While the microcomputer 200 is connected to the microcomputer creating PC 100 to perform processing of writing the program and the like into the flash ROM 210 in each example described above, processing of writing the program into the flash ROM 210 may be executed also for the microcomputer 200 after being incorporated into the apparatus. When, for example, the apparatus and the microcomputer creating PC 100 are connected to each other via a network, it can be considered that the connection IF 190 is replaced by a communication path of the network and the apparatus.

Further, the list in which each of the version representative values is associated with the license information and the test result information for each function that the corresponding program may execute has been described as the example of the version representative value list 401, the information that is associated with each of the version representative values may be one of the license information and the test result information. Additionally or alternatively, another list in which each of the version representative values is associated with another item of information may be used. In any case, any list in which, when the function that can be executed by the program written into the flash ROM 210 for each version is restricted, each of the version representative values and the information defining the restriction are associated with each other may be used.

Further, while the robot 300 has been employed as an example of the apparatus into which the microcomputer 200 is incorporated, another apparatus may be naturally used. Any apparatus in which a control program collectively controlling the whole apparatus uses a function program of a microcomputer may include the aforementioned microcomputer incorporated therein.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A program writing method in which a program is written into a flash read-only memory (ROM) that a microcomputer includes therein, the method comprising:
generating a version representative value that indicates a version of a source directory, and that is a hash value generated by hashing predetermined types of files included in the source directory;
writing the version representative value into a source file included in the source directory;
writing the program generated by compiling the source file into which the version representative value has been additionally written into the flash ROM, the program corresponding to the source directory; and
writing correspondence information indicating correspondence of the version representative value and a function that can be executed by the program written into the flash ROM, the correspondence information including license information for the function and test result information for the function that indicates a reliability when the function is executed.

2. The program writing method according to claim 1, further comprising:
writing a plurality of programs corresponding to a plurality of source directories, each having different versions, into the flash ROM in such a way that the programs can be used.

3. A storage medium storing a program writing program that causes a computer of a program writing apparatus connected to the microcomputer to execute the program writing method according to claim 1.

4. A control method of an apparatus on which a microcomputer is mounted, the method comprising:
acquiring correspondence information indicating correspondence of a first version representative value and a function to be executed in the apparatus, the first version representative value being a value of a version of a program in which execution of the function is permitted, the correspondence information including license information for the function and test result information for the function that indicates a reliability when the function is executed;
acquiring, from the correspondence information, the first version representative value based on the first version representative value satisfying a first condition of the license information and a second condition of the test result information based on the reliability being greater than a threshold reliability required by a control program of the apparatus, the first version representative value being a hash value generated by hashing predetermined types of files in a source directory of the program;

reading a second version representative value that has been written into a flash read-only memory (ROM); and executing the function based on determining that the second version representative value coincides with the first version representative value; or prohibiting the execution of the function based on determining that the second version representative value does not coincide with the first version representative value.

5. A storage medium storing the control program causing a host computer of the apparatus to execute the control method of the apparatus according to claim 4.

6. A control method of an apparatus on which a microcomputer is mounted, the method comprising:

acquiring correspondence information indicating correspondence of a first version representative value and a function to be executed in the apparatus, the first version representative value being a value of a version of a program in which execution of the function is permitted, the correspondence information including license information for the function and test result information for the function that indicates a reliability when the function is executed;

acquiring, from the correspondence information, the first version representative value based on the first version representative value satisfying a first condition of the license information and a second condition of the test result information based on the reliability being greater than a threshold reliability required by a control program of the apparatus, the first version representative value being a hash value generated by hashing predetermined types of files in a source directory of the program;

reading a plurality of second version representative values corresponding to a plurality of respective programs written into a flash read-only memory (ROM);

extracting a second version representative value that coincides with the first version representative value from among the plurality of second version representative values; and executing the function by the program corresponding to the second version representative value.

7. A storage medium storing the control program causing a host computer of the apparatus to execute the control method of the apparatus according to claim 6.

* * * * *